Inventor
Sam B. Gaither

Patented Aug. 30, 1949

2,480,567

UNITED STATES PATENT OFFICE 2,480,567

JOURNAL LUBRICATOR

Sam B. Gaither, Dunsmuir, Calif., assignor of forty-nine per cent to Audrey Wilhelm, Dunsmuir, Calif.

Application July 20, 1948, Serial No. 39,622

2 Claims. (Cl. 308—91)

This invention relates to lubricators designed with special reference for oiling the journals of car axles to prevent the overheating of the journals and bearings.

The invention provides for a positive feed of the lubricant and is to prevent any waste of the oil, the latter being contained in a reservoir in the journal housing in a manner to prevent dust and foreign matter from entering the oil and rendering same unfit for use as lubricant.

Another object of the invention is to provide a device that is simple and economical in construction, involving no maintenance costs and will eliminate the necessity for hot boxes in replacing the use of wool waste now commonly employed.

Other objects of the invention reside in the details of construction and in the combination of the various parts and in their mode of operation, as will hereinafter appear.

The following is a detailed description of a preferred embodiment of the invention, and is illustrated in the accompanying drawings, wherein.

Figure 1:
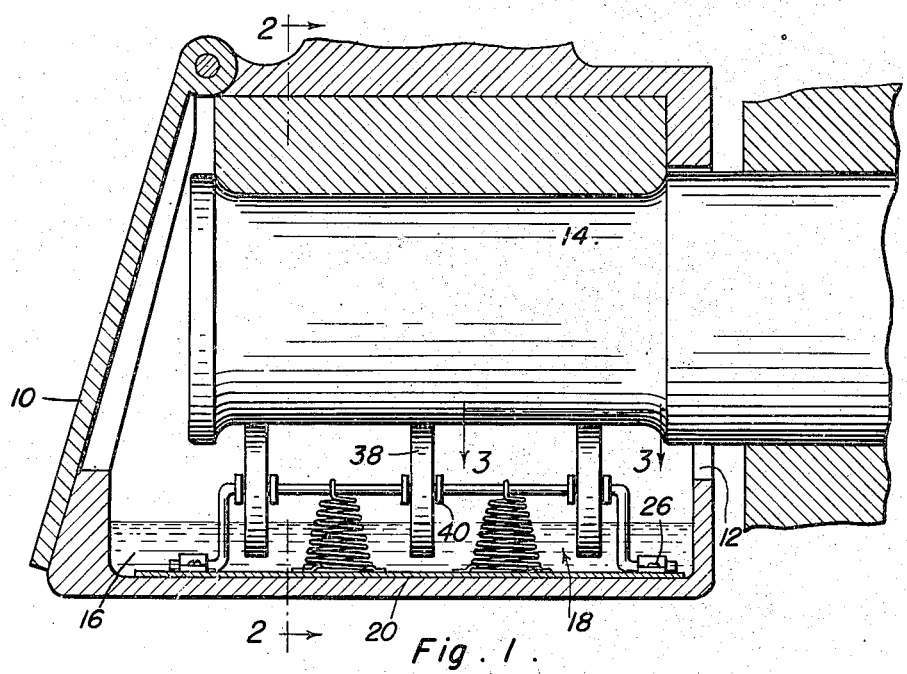
Figure 1 is a side elevation of the invention in use.
Figure 2:
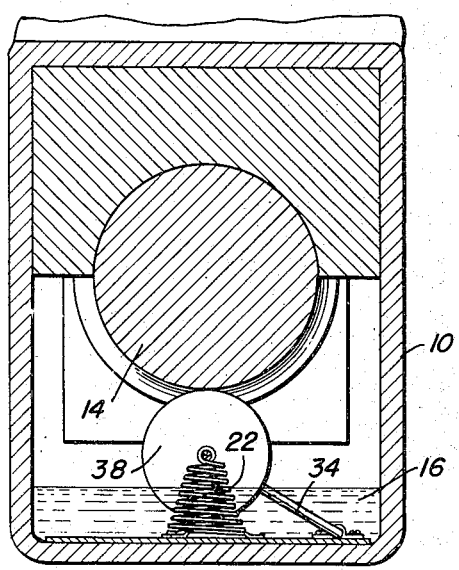
Figure 2 is a vertical transverse sectional view and is taken substantially on lines 2—2 of Figure 1; and, Figure 3 is a top plan view of the lubricator and is taken substantially on lines 3—3 of Figure 1.
Figure 3:
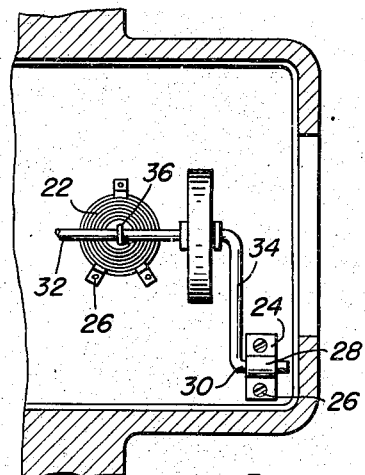

Referring to the figures, a locomotive journal box 10 is open at one end thereof at 12 to receive journal 14. The bottom of journal box 10 is suitably constructed to provide a well or basin to retain therein oil 16 for lubricating journal 14, during the rotation thereof.

The device of the invention is identified generally by numeral 18 and is adapted to be secured to a plate 20 positioned on the floor of journal box 10. Plate 20 secures thereon coil springs 22 and bearing sleeves 24 as by rivets or screws 26, or by welding, or the like. Sleeves 24 include an arcuate medial portion 28 into which the lateral ends 30 of a longitudinal supporting rod or bar 32 extend, rod 32 being connected to extremities 30 by means of inclined connecting links 34.

Coil spring 22 terminates in an ear or ring portion 36 for securing to support rod 32. Support rod 32 also retains lubricating collars or discs 38 for proper lubrication of journal 14. Collars 38, of which three are illustrated, although the number may be varied to suit the particular needs, are freely rotatable on support rod 32 and may be of ball bearing construction, if desired, although this is not necessary. Locking lugs or nuts 40 retain collars 38 in position.

The diameter of collar 38 is such that it clears the bottom of journal box 10 and engages the outer periphery of journals 14. Thus, as journals 14 rotate, discs 38 are in turn rotated through oil reservoir 16 to carry up a portion of the oil contents and thereby lubricate journals 14. This is accomplished by centrifugal force, and the faster the rotation of journals 14, the greater the amount of oil supplied. Positive feed is thus obtained, and by the construction of discs 38, virtually all of the oil in the journal box will be used before the necessity of refilling same.

Springs 22 urge collars 38 against journal 14 and also hold shaft 32 in proper position for the operation of the device.

While a preferred embodiment of the invention has been shown and described, it is to be understood that various changes in size, shape and arrangement of parts may be made without departing from the spirit of the invention, or the scope of the appended claims.

Having described the invention, what is claimed as new is:

1. A journal lubricator consisting of a journal box receiving said journal and providing an oil reservoir, a plate secured in said reservoir, a supporting shaft including lateral extensions, means securing said extensions to said plate, a disc collar rotatably mounted on said shaft and tension means secured in said reservoir and engaging said supporting shaft, said collar extending into said reservoir and engaging the periphery of a journal to lubricate same on rotation thereof.

2. The combination of claim 1 wherein said tension means is a coil spring, the free end thereof terminating in an eye secured on said shaft for maintaining said shaft in operative position while compensating for the diameter of a journal lubricated.

SAM B. GAITHER.

REFERENCES CITED

The following references are of record in the file of this patent:

UNITED STATES PATENTS

| Number | Name | Date |
|---|---|---|
| 189,133 | Palmer | Apr. 3, 1877 |
| 323,605 | Sterling | Aug. 4, 1885 |
| 358,583 | Timms | Mar. 1, 1887 |